Patented Mar. 25, 1941

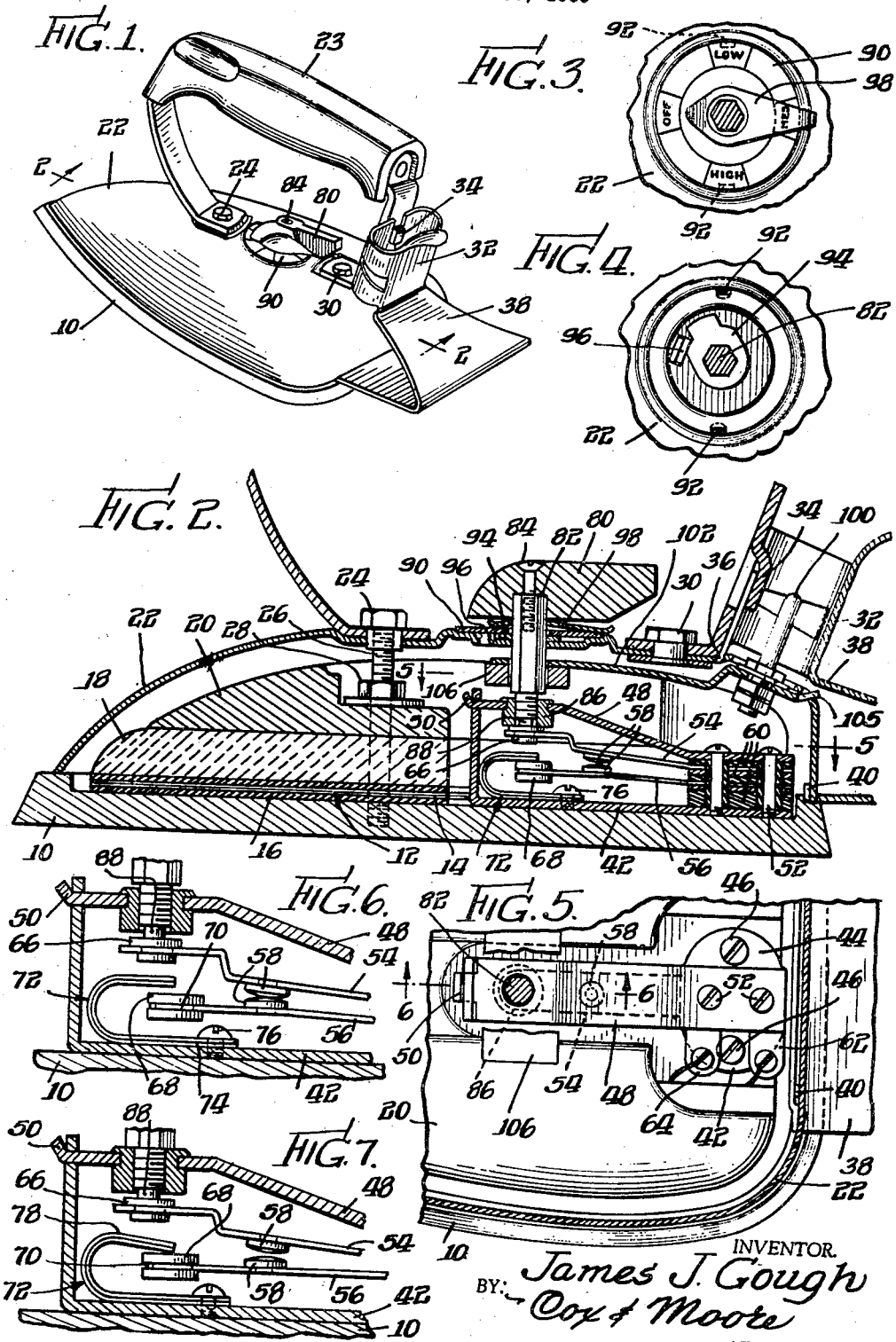

2,236,478

UNITED STATES PATENT OFFICE 2,236,478

THERMOSTATICALLY CONTROLLED APPLIANCE

James J. Gough, Chicago, Ill., assignor to Chicago Electric Manufacturing Company, Chicago, Ill., a corporation of Illinois Application January 30, 1939, Serial No. 253,573

8 Claims. (Cl. 200—138)

The present invention relates to an electrical appliance and more particularly to a thermostatically responsive device for controlling temperatures.

The present invention contemplates more particularly the provision of a thermostatic control unit for selectively interrupting electric current supplied to the heating unit of an appliance in order to maintain the temperature at or about a predetermined adjustable value. To this end the present invention provides a unit which is compact and relatively simple in construction and capable of being rapidly assembled. Structures hitherto known in the art have in general been characterized by relatively great bulk. In particular, the temperature responsive elements in use have been such as to necessitate a unit of considerable length and extent in order to produce the necessary range of flexure for the proper control, and to this end it has been necessary to resort to mechanical structures for modifying the resultant mechanical action before applying it to the control of electrical current.

It is an object of the present invention to alleviate these difficulties by providing a thermostatically responsive actuating member cooperable with a circuit control device wherein the thermostatic member is relatively small yet capable of exerting the necessary control action without the assistance of mechanical adjuncts for modifying the mechanical action thereof.

A yet more specific object of the present invention is to provide a thermostatic control structure as above having a curved or reversely extending bimetallic element adapted to increase in curvature under the influence of elevated temperatures to control a separately operable circuit-breaking device.

Among other objects of the present invention are to provide an adjustable thermostatic control device as above in which temperature control is effected by movement of the circuit-making and breaking contact as a unit relatively to the thermostatically actuable control member; to provide an adjustable control device the movable parts of which are tensioned against relative displacement and vibration; and to provide a structure as above in which the parts are readily disassemblable for service, repair and adjustment.

Numerous other objects and advantages of the present invention will be apparent throughout the course and progress of the following specification, wherein:

Figure 1 is a perspective view of an electric iron constructed in accordance with the present invention;

Figure 2 is a sectional view taken centrally through the iron shown in Figure 1 on the line 2—2 thereof;

Figures 3 and 4 are detail fragmentary views of the indicator and adjustment limiting means of the thermostatic unit;

Figure 5 is a detail sectional view taken on the line 5—5 in Figure 2; and

Figures 6 and 7 are detail elevational views of the circuit-making elements and thermostatic actuating unit therefor, Figure 6 showing the parts in normal position and Figure 7 illustrating the manner of coaction at a predetermined elevated temperature.

Reference is made to the drawing, wherein there is disclosed for illustrative purposes an electric iron embodying the principles of the present invention. The instant iron comprises the conventional sole plate 10 centrally channelled to receive a heating element 12, which, in the usual practice, may comprise a suitably supported heating coil 14 enclosed on either side by protective or so-called fish plates 16. It should be noted that the heating unit 12 extends adjacent the forward and side parts of the sole plate, being cut away adjacent the central and rear portions of the shoe to permit mounting of a thermostatic device directly upon the surface of the sole plate, as will hereinafter appear more in detail. In the present embodiment the heating element is surmounted by an insulating block 18, over which is positioned, in turn, a block 20 of any suitable material having, among other advantages, that of additionally weighting the structure. It will be apparent that the lamination or block 18, which may comprise, for example, porcelain, will tend to insulate the heavier block 20 from the region of the heating instrumentalities and to concentrate the available heat energy in the sole plate and prevent hazardous overheating of the upper portion of the appliance. The inner construction of the iron is enclosed by a shell 22 which seats adjacent the periphery of the sole plate and is held in place by a cap nut 24 threadedly engaging an assembly post 26. It should be noted that the assembly post 26 extends through the blocks 18 and 20, being threadedly engaged in the sole plate 10 and locking the inner members together through the agency of jam-nut means 28.

The present iron is provided with a handle 23, the forward part of which is fastened in place by the fastener 24, the handle being suitably apertured to be alined with the adjacent aperture in the shell for coincidentally receiving the fastener. The rearward supporting post of the handle is flanged forwardly and fastened to the shell by a rivet 30.

A terminal housing 32 is locked to the shell and the handle through the agency of a plurality of interlocking means comprising a struck out portion 34 centrally on the rear support of the handle for engaging interiorly of the terminal housing through a suitable aperture in an adjacent wall thereof, as clearly shown in Figure 2. A projecting portion of the housing just below the aforementioned interengaging portions and designated by the reference numeral 36 is at the same time fixed in a corresponding aperture in the upper surface of the shell 22. The terminal housing is additionally extended rearwardly as at 38 to provide a rest member, the extremity of which engages within the shell as at 40.

The thermostatic control unit to which the present invention more particularly relates is, as clearly shown in Figures 2 and 5, situated in a suitable central recess or cut-away portion of the aforementioned interior assembly and comprises a supporting frame or base comprising a generally L-shaped strap of material 42, which is widened adjacent its rearward end to provide oppositely extending lugs 44 for attachment directly to the sole plate through the agency of machine screws 46. The upper part of the supporting frame is provided by a second strap of material 48 engaged with the upwardly extending arm of the lower frame member 42 by means of an interengaging lug and aperture connection 50. The opposite ends of the two frame members 42 and 48 are operatively connected and joined by machine screws 52 and a laminated pile comprising insulating members and connectors and providing a support for a pair of circuit control elements.

The circuit control elements more particularly comprise a pair of spring fingers 54 and 56 having mounted thereon a pair of contact points 58. As clearly shown in Figure 2, the right-hand extremities of the spring members 54 and 56 are supported between layers of insulating material 60, connecting lugs 62 and 64 being disposed in adjacent contacting relationship against the respective spring members and projecting outwardly of the pile, as shown in Figure 5, for connection in the electrical circuit.

The upper spring finger 54 presses resiliently upwardly and is provided on its end with an insulating button 66. The means for interconnection of the button and the spring finger comprises a tapering slot or bifurcation on the end of the latter member which clampingly embraces the narrow central portion of the button. The lower spring member is arranged to press resiliently upwardly from the position shown and is provided at its terminus with a similar insulating button 68 mounted on the bifurcated end of the spring finger 56 through the agency of a central annular reduced portion or channel 70.

The lower spring member is normally limited against upward movement by impingement of the contacts 58, it being understood that the respective fingers are in series arrangement in the heating circuit whereby current normally passes to the heating element 12. The circuit is, in accordance with the present invention, controlledly ruptured by the action of a thermotsatic element 72, Figures 2, 6 and 7, which, in the embodiment shown, under normal conditions possesses a U-shaped form, that is, with a lower arm or run 74 extending horizontally and fastened rigidly in heat-conducting relationship to the frame 42 by means of machine screws 76. An upper arm of the thermostatic element extends parallel to the lower arm but in the opposite direction and terminates in a free extremity just above the insulating button 66.

It will be apparent that the thermostatic element in the present construction is of the known bi-metallic type, although, in accordance with the present invention there may be substituted therefor any known temperature responsive material having the kindred properties of flexing under the influence of elevated temperatures. Attention is particularly directed to the fact that the present bi-metallic strip is so formed and arranged that under the elevated temperatures which may prevail in the iron the radius of curvature of the curved portion of the strips tends to decrease to bring the free extremity downwardly and forcibly against the button 66, as shown in Figure 7. For any elevated temperature it will be obvious that the free end of the bimetal will be lowered a predetermined distance. Accordingly, when a predetermined temperature has been reached the action of the above structure is to move the insulating button 66 and, accordingly, the lower resilient arm 56 downwardly to separate the contacts 58 to rupture the heating circuit.

Variable control of the limiting temperature is effected through the agency of a manual control handle or knob 80 on the upper exterior surface of the shell, the knob being mounted on a hexagonal post or shaft 82 through the agency of machine screw 84. The lower end of the post is threadedly engaged in a sleeve 86 rigid with the upper strap 48 of the thermostat supporting frame. The lower extremity of the post is reduced as at 88 and provides a positioning stop for the insulating button 66 on the upper control finger 54. It will be obvious from the above disclosure that rotation of the shaft 82 will result in vertical displacement of the shaft relative to the fixed sleeve 86 to control the vertical position of the end of the upper spring member. That is to say, for example, if the thermostatic control handle 80 and, accordingly, the post 82 are rotated to the right the lower extremity 88 of the post will be adjusted downwardly against the insulating button 66 and will carry with it not only the upper spring finger but also the lower spring member, which is normally spaced therefrom by the contacts 58. Such adjustment of the control handle 80, accordingly, results in bodily lowering the elevation of the insulating button 66 so that the thermostatic element 72 must, therefore, be subjected to a relatively greater degree of curvature in order to approach the position where it may displace the button 68 to break the circuit as aforementioned. That is to say, the thermostatic element must be subjected to a correspondingly increased temperature factor to actuate the lower spring member in its new or relatively downwardly displaced position.

It will be understood that in assembly the parts are so positioned and arranged that any setting of the control handle 80 corresponds to predetermined temperature. It should be noted that just below the control handle 80 the shell is configurated with a circular recess to accommodate an indicating dial 90, Figures 2 and 3, rotational displacement being prevented by lugs 92 on the plate 90 engaging in suitable apertures in the shell. Just below the indicating plate 90 there is arranged a limiting control arm 94 provided with a polygonal aperture for splined interengagement with the central hexagonal post or shaft 82. The limiting control arm cooperates with a struck-out, upstanding lug 96 in the surface of the shell 22 to limit the range of rotation of the control knob 80 to a predetermined rotational path of less than 360 degrees. The foregoing parts are all maintained in position under resilient tension through the agency of spring member 98, Figures 2 and 3, curved, as clearly shown in the former figure, to bear against the lower surface of the control handle as well as the indicating plate 90 and the shell 22. From the foregoing it will be understood that the limiting control finger 94 rotates in splined relation with the post 82 while being enclosed between the relatively fixed, opposed portions of the dial 90 and the shell 22.

Electrical energy is normally supplied to the device through the agency of a pair of contact prongs 100 insulatingly mounted upon a more or less resilient arm 102, having at its rearward extremity an interengaging lug connection 105 with the shell and at its forward extremity resting upon a transverse plate 106 rigidly mounted upon and extending across the central recess in the upper weighting block 20. According to the preferred embodiment of the present invention, the spring member resiliently rests upon the supporting plate 106 while embracing the post 82. In accordance with this construction it will be obvious that it forms a portion or part of the shell for purposes of assembly and disassembly, while being adequately supported and fastened when the parts are in assembled relationship.

From the foregoing it will be apparent that in operation the heating element is normally supplied with current through the agency of connecting lugs 64, spring fingers 54 and 56 and contacts 58. At a predetermined temperature, flexure of the thermostatic element 72 forces the lower resilient member 56 downwardly to break the circuit between the contacts 58. If it is desired to limit the increasing temperature of the appliance the control handle is rotated the desired degree to lower the post 82 and actuate the lower insulating button 68 downwardly with respect to the thermostatic control device. This necessitates the attainment of a higher predetermined temperature to again permit rupture of the heating circuit.

The present invention provides a very simple and effective thermostatic control which tends to be free from the objectionable uncontrollable variations occurring in many devices known in the art. That is to say, the present thermostatic actuator, being relatively small, eliminates the variability inherent in relatively complex or elongated control members. Attention is further directed to the fact that the conformation of the thermostatic element is such as to effect a relatively great degree of resultant movement acting on a relatively small lever arm to the end that the operation and breaking of the circuit is positive and accurate.

It is thought that the invention and numerous of its attendant advantages will be understood from the foregoing description, and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

The invention is claimed as follows:

1. For use with an electric heating appliance having a heated plate, a thermostatic control device comprising a pair of relatively separable contact members spaced substantially above said plate, a thermostatic control element for actuating said separable members, and comprising a temperature responsive member having a portion residing flatwise against said plate and attached thereto, a second portion being bent upwardly from said plate and supporting a third portion in position to engage above one of said contact means to actuate it downwardly as said temperature responsive member responds under the influence of an elevated temperature.

2. For use with an electric heating appliance, a thermostatic control device comprising a pair of relatively separable contact members, a thermostatic control element operatively arranged for separating said contact members under the influence of elevated temperature, and means for adjusting said contact members relative to the thermostatic control element whereby to variably control the temperature of separation of the contacts, said thermostatic control element comprising a substantially U-shaped curved portion adapted to increase in curvature with an increase in temperature conditions.

3. For use with an electric heating appliance, a thermostatic control device comprising a pair of relatively separable contact members, a thermostatic control element operatively arranged for separating said contact members under the influence of elevated temperature, and means for adjusting said contact members relative to the thermostatic control element whereby to variably control the temperature of separation of the contacts, said thermostatic control element comprising a fixed portion, a curved portion comprising a substantially 180 degree arc of curvature connected therewith and adapted to increase in radius of curvature upon application of an elevated temperature and a portion extending from said curved portion and movable to actuate said circuit-breaking means.

4. For use with an electric heating appliance, a thermostatic control device comprising a pair of resilient supporting members having electrical contacts thereon, a thermostatic control element movable under an increase in temperature in a direction to separate said contacts, and adjustment means controllable for actuating both of said contact members in said direction of separation whereby to prevent separation of said contacts at said first mentioned temperature, said thermostatic element comprising a bent heat responsive strip adapted to distort laterally at elevated temperatures, one end being fixed, the other end extending in substantially opposite directions and being arranged in operative relationship adjacent one resilient member to cause said separation of the contacts at a predetermined elevated temperature.

5. For use with an electric heating appliance, a thermostatic control device comprising a pair of resilient supporting members, contact means on said resilient supporting members adapted to be normally urged in contacting relationship, adjustment control means operatively associated with one of said resilient supporting members for urging one of said members in a predetermined direction toward the other of said members whereby to urge both of said members in said predetermined direction while maintaining electrical contact between said contact means, and a thermostatic control element operable at an elevated temperature to actuate the other of said resilient supporting members in substantially said direction to separate the contacts whereby actuation of said adjustment control means provides adjustment of said resilient supporting members relative to the thermostatic element for varying the effective temperature of separation of said contact means, said thermostatic element comprising a temperature responsive strip having a portion fixed in heat-conducting relationship to a heated surface, a curved portion extending away from said heated surface and adapted to decrease in radius of curvature with an increase of temperature, and supporting an actuating portion at a point remote from the heated surface for separating said contacts.

6. For use with an electric heating appliance, a thermostatic control device comprising a pair of resilient supporting members, contact means on said resilient supporting members adapted to be normally urged in contacting relationship, a control member making operative contact with one of said resilient supporting members to actuate both of said resilient supporting members in a predetermined direction, and a thermostatic control element normally spaced from said supporting members and actuable at elevated temperatures in substantially said direction to make operative connection with the other of said supporting members, said thermostatic control element being relatively fixed with respect to the resilient supporting members whereby adjustment of said latter members varies the effective separation of the thermostatic control means whereby to control the rupture of the heating circuit, said thermostatic element comprising a temperature responsive member attached to said appliance and having a generally reversely curved portion extending from said fixed portion, said reversely curved portion terminating in a free extremity oppositely but laterally spaced from said point of attachment and being adapted to move laterally toward said fixed portion under the influence of elevated temperatures.

7. For use with an electric heating appliance having a heat applying member, a thermostatic control device comprising a plurality of resiliently supported contact members normally urged in contacting relationship, and a thermostatic control element operable at an elevated temperature to separate said contact members, said thermostatic element comprising a curved member having opposite extremities extending in substantially opposite directions and being adapted to decrease in radius of curvature at elevated temperatures, said last named member having one end fixed in heat-conducting relationship to said heat applying member and having the other end substantially free.

8. For use with an electric heating appliance having a heat applying member, a thermostatic control device comprising a plurality of resiliently supported contact members normally urged in contacting relationship, and a thermostatic control element operable at an elevated temperature to separate said contact members, said thermostatic element comprising a generally U-shaped temperature responsive element having one end fixedly mounted adjacent said heat applying member and the other end being free and in operative circuit-breaking position adjacent said contact members, said U-shaped element having its curved portions adapted to decrease in radius of curvature at elevated temperatures whereby to bring said free end toward said fixed end for actuating said contact means to circuit-breaking position.

JAMES J. GOUGH.